Aug. 12, 1924.  
E. R. FELLOWS  
GEAR GENERATING MACHINE  
Filed July 29, 1922   8 Sheets-Sheet 5
1,504,223
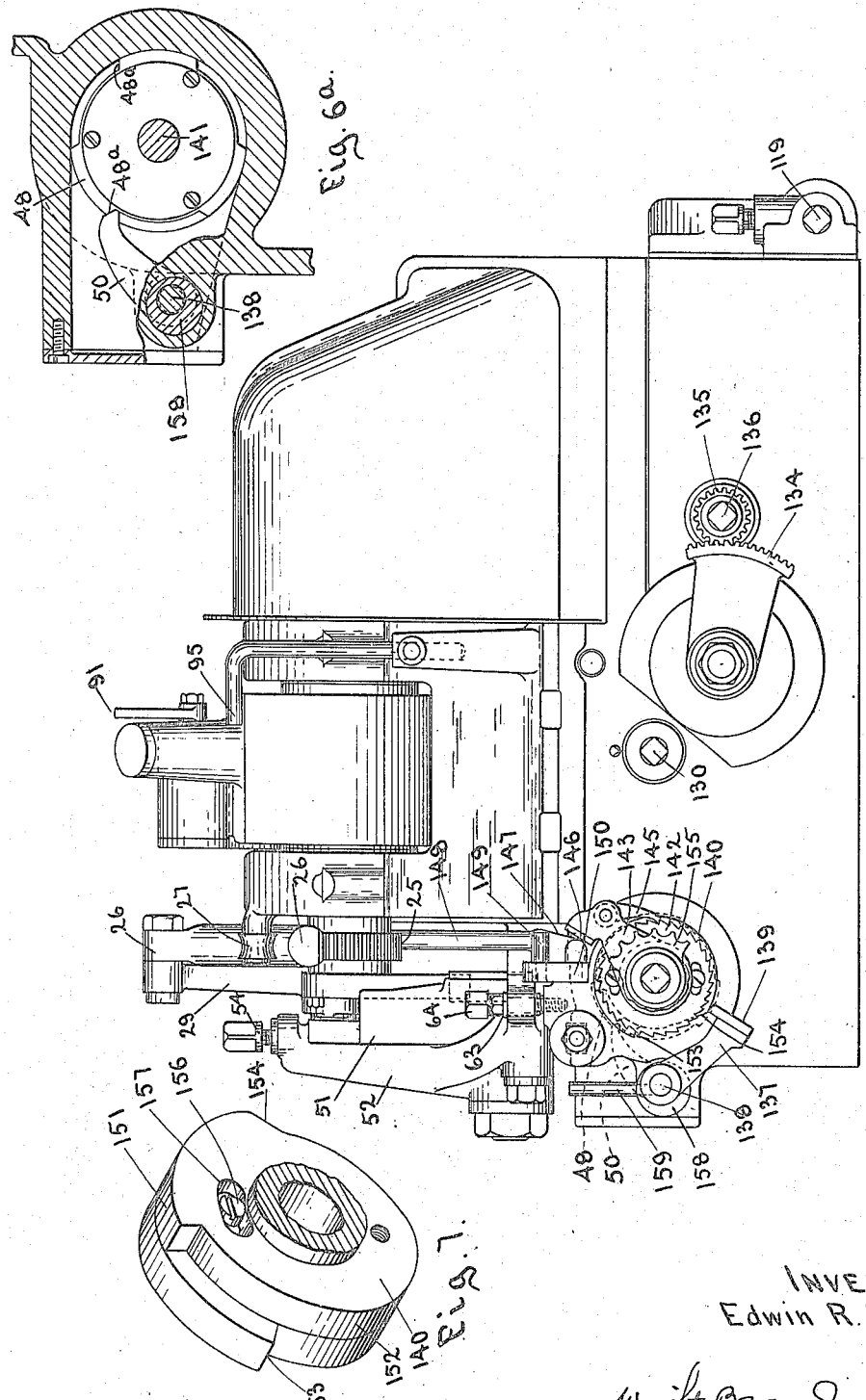
INVENTOR  
Edwin R. Fellows  
by Wright, Brown, Quinby & May  
att'ys

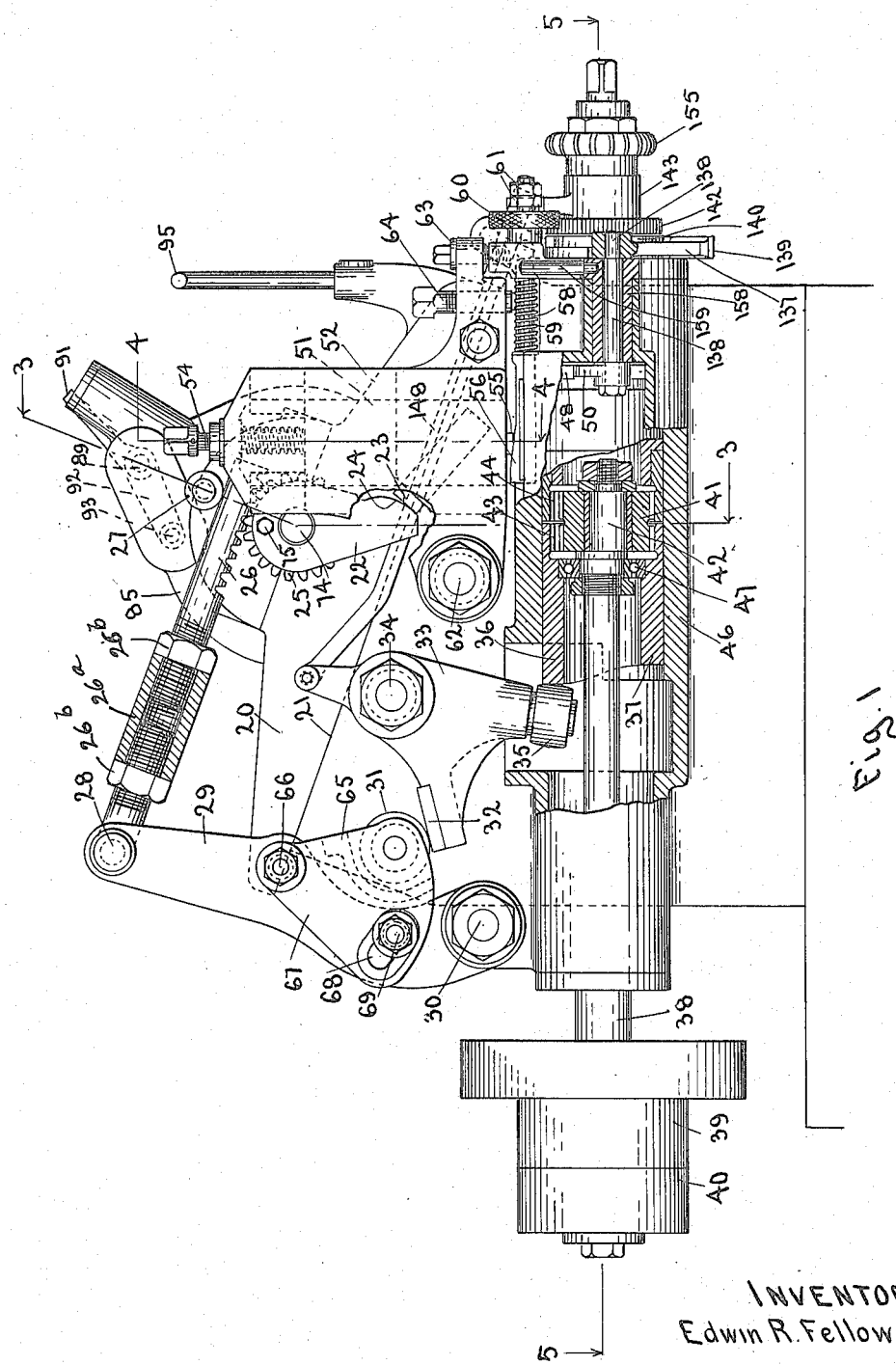

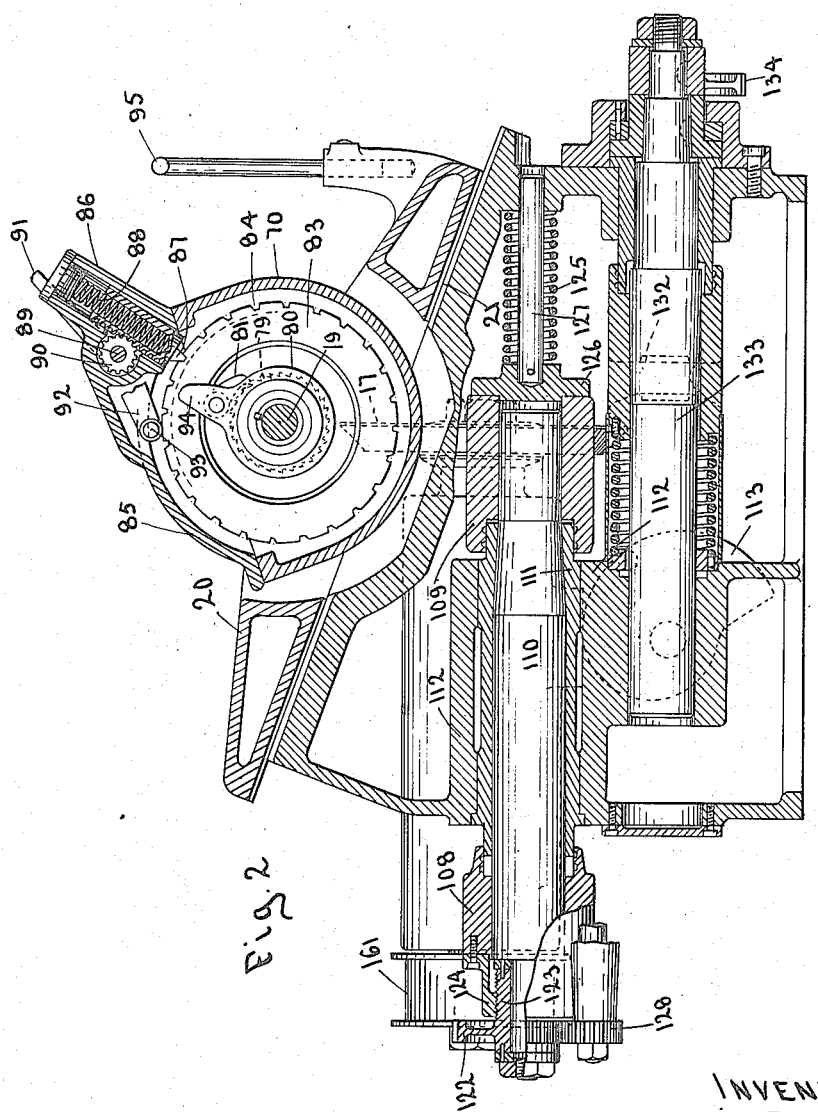

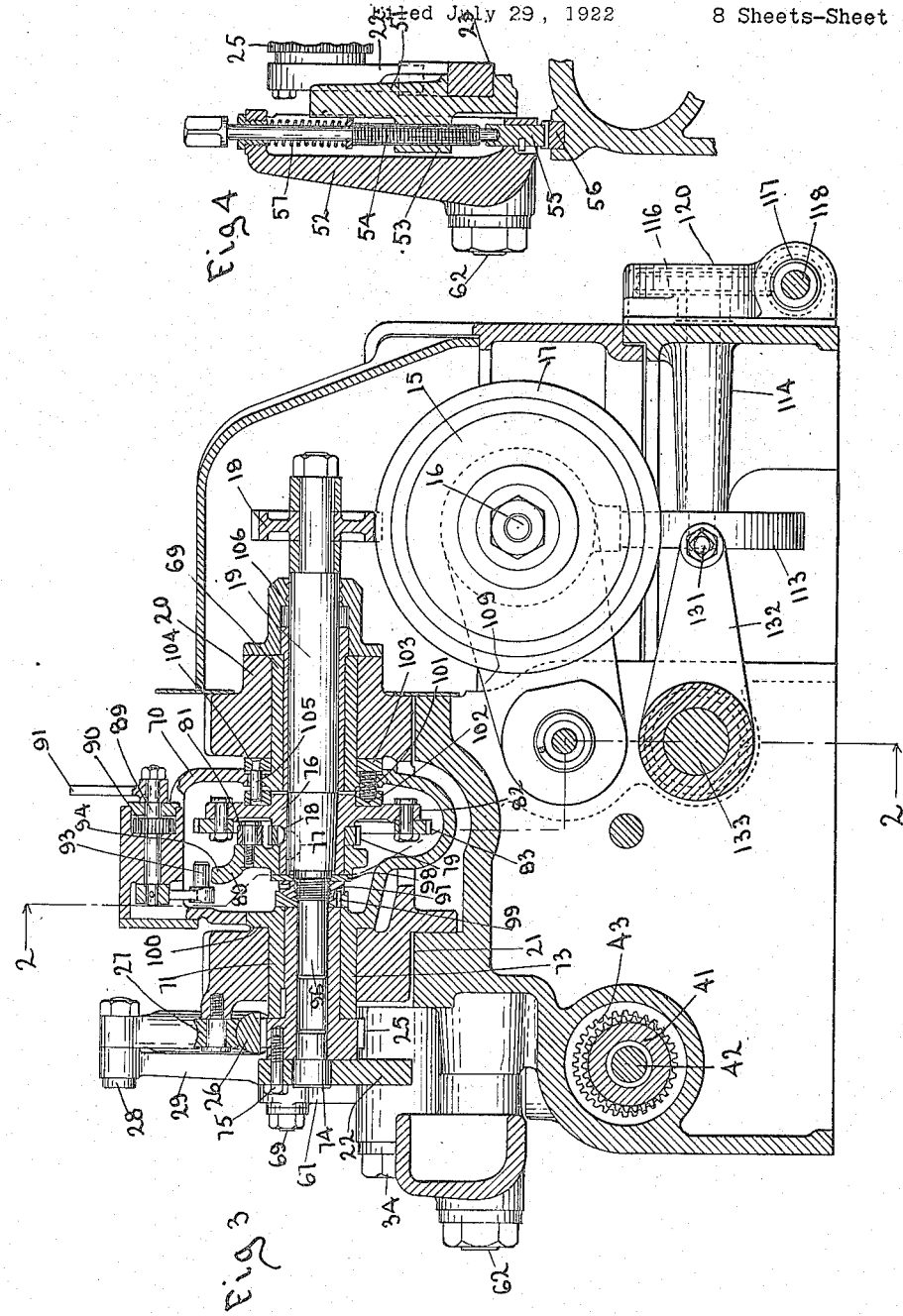

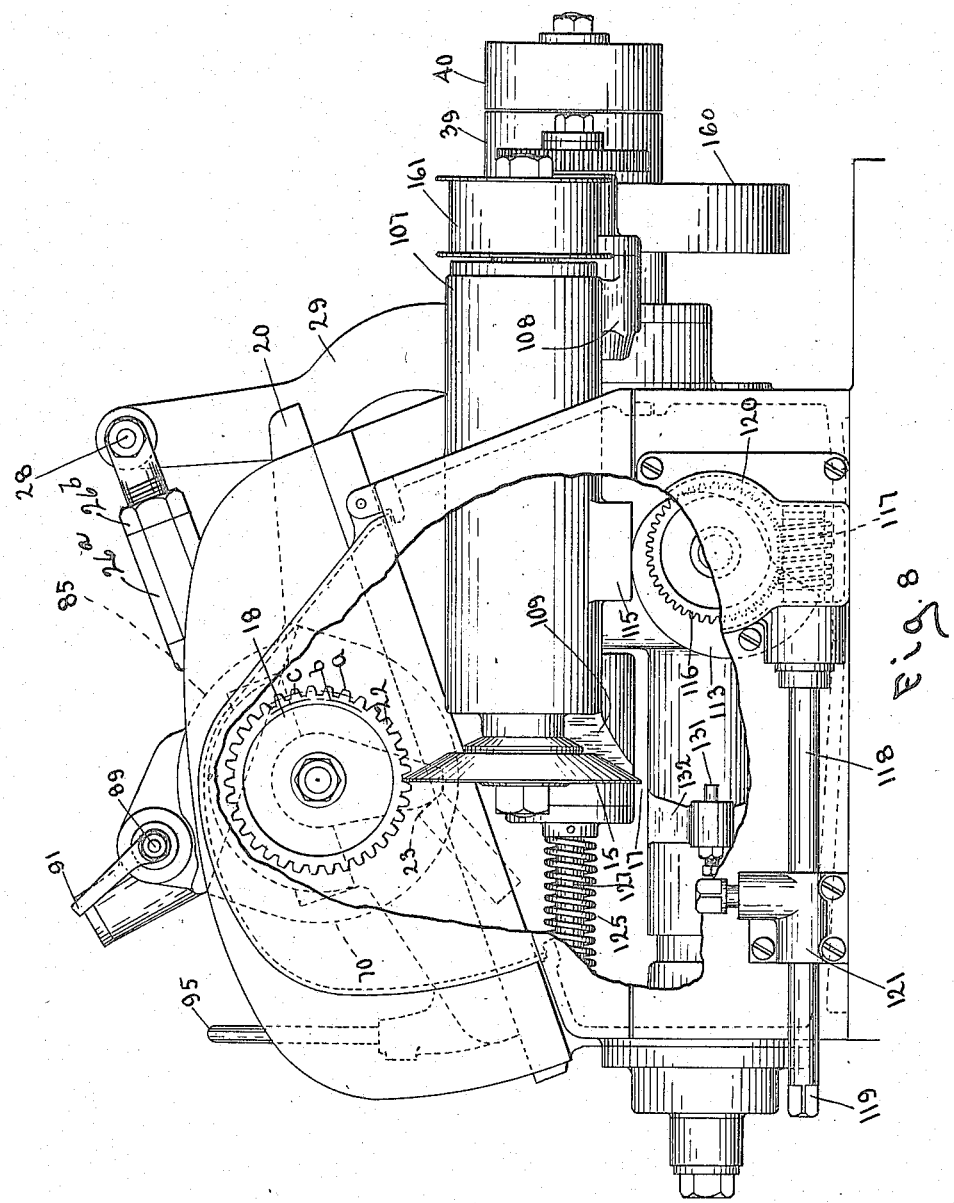

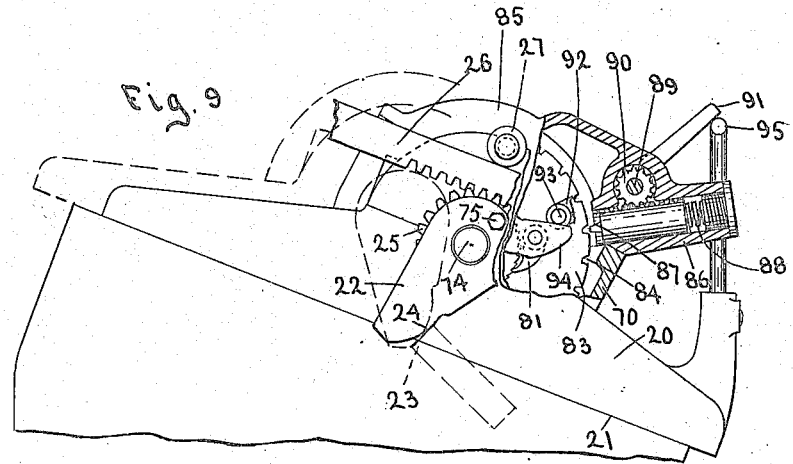
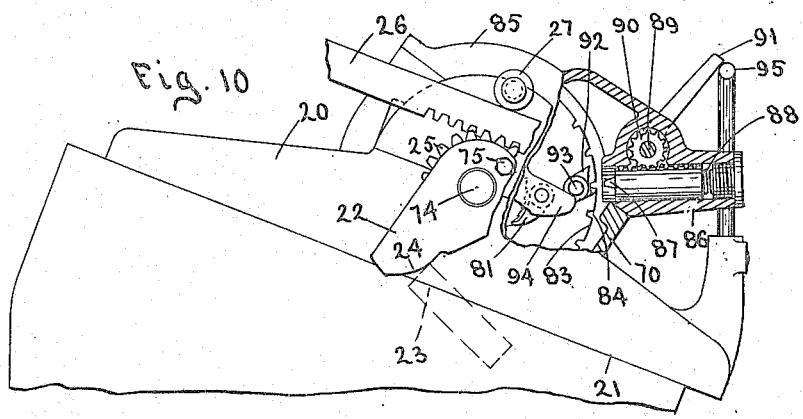
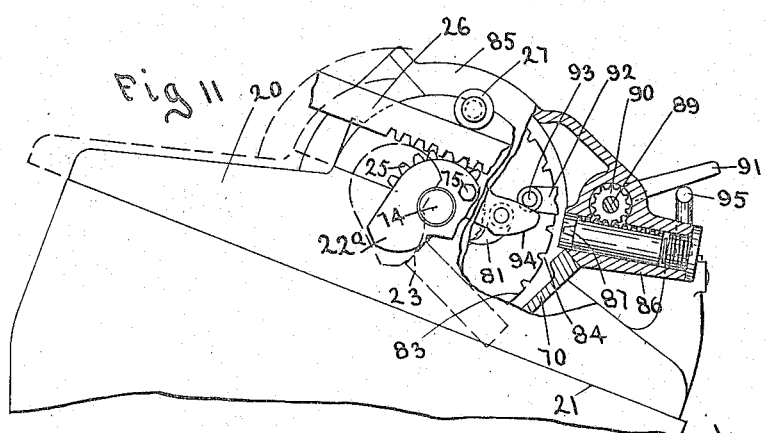

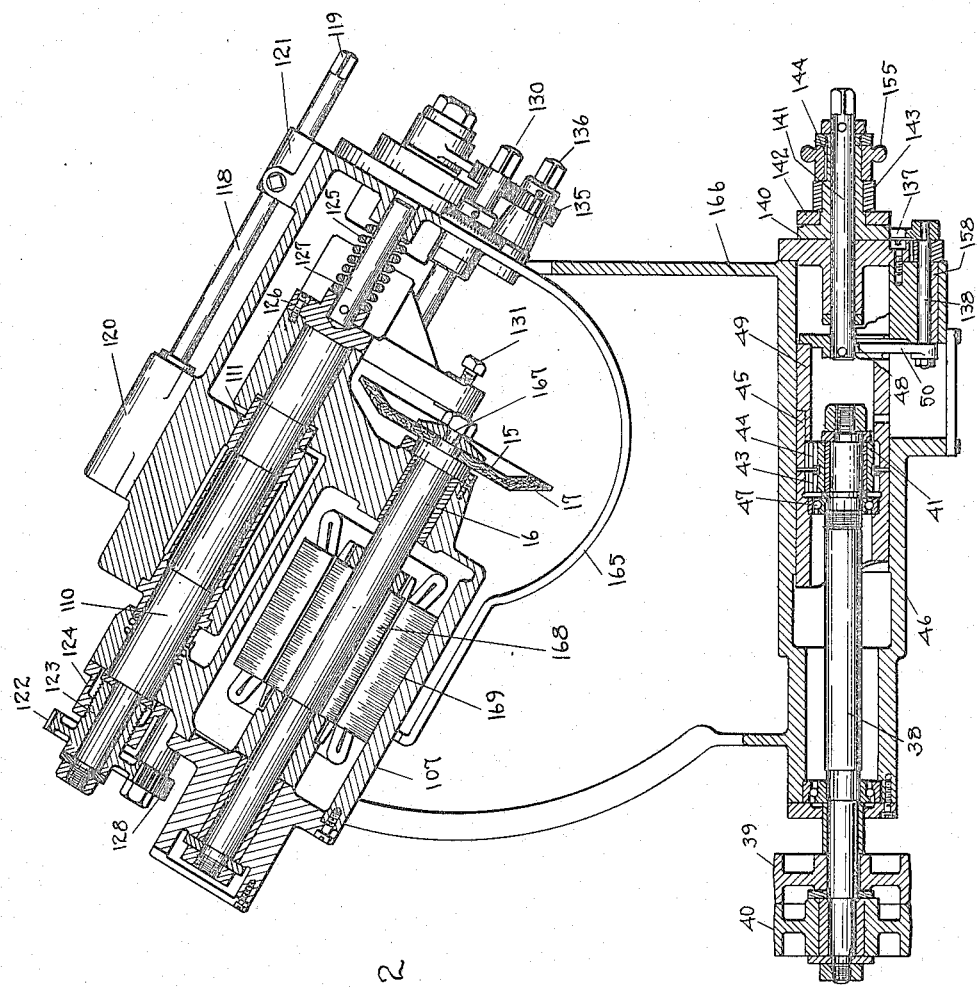

Patented Aug. 12, 1924.

1,504,223

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

GEAR-GENERATING MACHINE.

Application filed July 29, 1922. Serial No. 578,288.

*To all whom it may concern:*

Be it known that I, EDWIN R. FELLOWS, a citizen of the United States, residing at Springfield, in the county of Windsor and State of Vermont, have invented new and useful Improvements in Gear-Generating Machines, of which the following is a specification.

The present invention relates to a machine adapted to finish gear wheels and the like by grinding, and in the course of the grinding operation to generate correct curves in the faces of the teeth. More particularly it is designed and intended for operating upon spur gears, and the particular embodiment herein illustrated is designed for that particular use. However, many of the principles of the invention may be embodied in other specific machines and for other specific classes of work, such as bevel gears, the gear generating cutters displosed in prior patents of mine, including Patents No. 579,570 granted March 30, 1897, No. 579,708 granted March 30, 1897, and No. 675,226 granted June 11, 1901, and others. Generically, then, the invention comprises a machine for grinding and at the same time generating the tooth curves of gears and analagous articles, which have teeth whereof the faces in profile have characteristic curves capable of being generated by relative motion between a grinding wheel and the work piece. Still further, the invention is not necessarily limited to a machine in which the cutting tool is a grinding wheel, since the same principles of operation and control may equally well be applied in cases where the tool has distinct edges or teeth, as a milling cutter, and so forth. Hence for the purpose of this specification, the term "grinding wheel" is to be construed as generically including any suitable cutter, except where the context requires otherwise, and the term "gear" is to be construed as including any work piece capable of being cut and shaped to a prescribed form by the joint action of such tool and other operating elements of the machine. Inasmuch, however, as I have embodied the invention in a machine using a grinding wheel and being organized for operating on spur gears, and have chosen to disclose such machine in this specification for illustration of such principles, I will hereinafter describe and explain the invention in terms of that particular machine, at the same time having it understood that the actual invention is in some respects broader than the said specific embodiment, as indicated by the foregoing statements and definitions, and to the extent of its novelty over the prior art.

One object of the invention is to provide, in a machine of the sort indicated, means by which the tooth curve to be generated in the work may be accurately determined and readily modified and changed for gears of different sizes, different pitches, or different tooth angles, or for generating conventional characteristic tooth curves, such as the pure involute curve, or any modified curve capable of being generated by appropriate relative movement between the cutter and the work. Another object is to provide in such a machine simple and inexpensive means for obtaining a high degree of accuracy in the accomplishment of the end desired, including substantial elimination of backlash and lost motion. A further object is to combine with such means simple but accurate means for indexing the work; and an efficient and simple means for automatically stopping the machine when the required number of operations on a given work piece are completed.

The manner in which these objects are accomplished, as also the principles and characteristics of the invention, are explained in connection with the following description of a specific gear grinding machine embodying the invention, to which attention is now directed in connection with the accompanying drawings.

In the drawings,—

Figure 1 is a side elevation with parts broken away and shown in section of the machine referred to.

Figure 2 is a longitudinal section of the machine, the plane of section being indicated by the line 2—2 of Figure 3.

Figure 3 is a cross section taken on line 3—3 of Figure 1.

Figure 4 is a sectional view of a detail consisting specifically in the means for mounting and adjusting the abutment for the former, the plane of section being indicated by the line 4—4 of Figure 1.

Figure 6 is an elevation of the machine as seen from the right of Figure 1.

Figure 5:
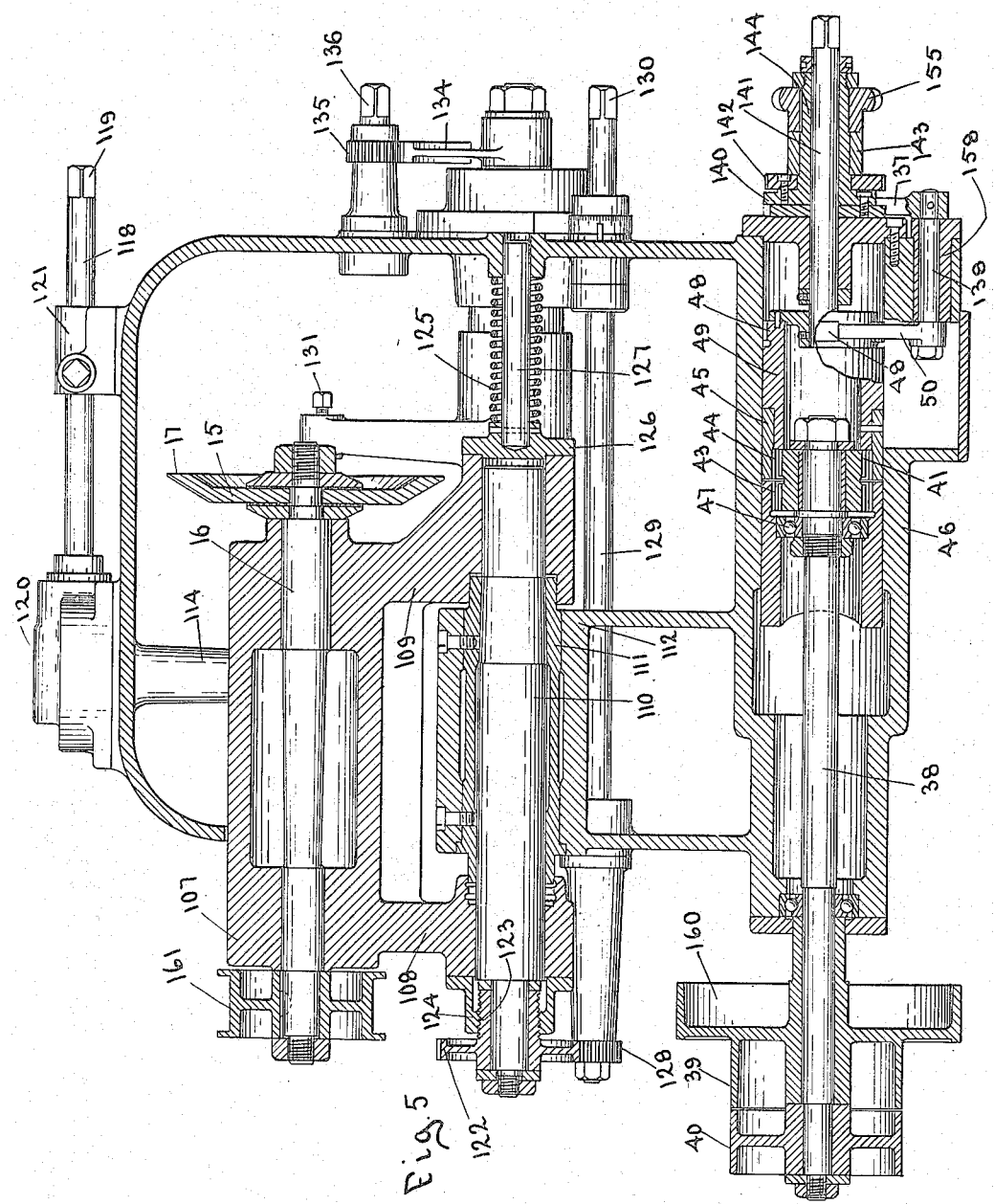
Figure 5 is a horizontal section on line 5—5 of Figure 1.

Figure 6ᵃ is a cross section, on a larger scale, of a detail of driving mechanism.

Figure 7 is a perspective view of a compound cam used in the mechanism for automatically stopping the machine.

Figure 8 is an elevation of the machine as seen from the side opposite to the view point of Figure 1, part of the casing being broken away to show interior parts.

Figures 9 and 10 are fragmentary elevations and partial sections illustrating the operation of indexing the work.

Figure 11 is similar to Figure 10, except that it illustrates a different former used for grinding a smaller gear than those for which the machine is adjusted in other views.

Figure 12 is a horizontal section showing a modification of the machine designed for grinding helical gears.

Like reference characters indicate the same parts wherever they occur in all the figures.

In order to secure the desired accuracy in the formation of the tooth curves, it is practically necessary that a combined motion of translation and rotation be effected between the cutter and the work, similar to the motion of a gear wheel, like the work piece, when rolling in mesh with a rack conjugate to it, and that the portion of the operating tool which acts upon the work should correspond in profile to the tooth face of such a rack. Furthermore, it is practically necessary that the tool used be a rotatable one, having its active face, if a grinding wheel, or its cutting edge or points, if a cutter of other type, in a plane perpendicular to its rotational axis, since such a tool can be driven and maintained in working condition and in the proper contour with the greatest accuracy and the least difficulty and complication.

Preferably all components of the rolling motion between the work piece and the cutter are given to the work piece, in the interest of simplicity, while to the cutter is given only a motion of rotation about its own axis; and in the present embodiment the cutting tool 15, a grinding wheel, is mounted on a rotating shaft 16 with its operating face 17 in a plane perpendicular to the axis of such shaft (see Figures 5 and 8), while the work piece 18 (Figures 3 and 8) is mounted on a work spindle in or parallel to the plane of the face 17. In order to effect the desired motion of rotation and translation of the work relatively to the grinding wheel, the cutter spindle is mounted rotatably in a carriage 20 which slides upon a fixed guideway 21, and the plane in which said guideway is located makes an angle with the plane of the active face 17 approximately equal to the angle which the face of a rack conjugate to the gear being ground makes with the pitch line of such rack, so that the effective motion of the work piece relatively to the grinding wheel is that of rolling motion on its pitch circle. The exact quality of such rolling motion necessary is determined by the shape of an element which I call a "former" and by the shape, position and inclination of the face of an abutment against which said former acts and which I call a "former abutment."

Such former is shown at 22 and the abutment at 23. The former is secured to the work spindle by means which I will later describe, and has a face 24 which is preferably curved similarly to the curvature to be generated in the teeth of the work piece, which face bears against an opposed surface of the abutment 23, the latter being mounted in a normally stationary manner but with provision for adjustment. Preferably said surface of the abutment is similar to the active face of the grinding wheel, that is, it is a plane surface when such active face is plane, but where the profile of the grinding wheel or other cutting tool is other than plane, the face of the abutment is correspondingly formed. These faces may, however, be otherwise formed, as later described.

The face 24 of the former is caused to roll against the opposed face of the abutment, and thereby imparts the desired movements of rotation and translation to the gear blank. It is operated to that end by the following mechanism. A gear 25 concentric with the work spindle is secured to the former and is in mesh with a rack 26 which reciprocates endwise under a retaining guide roll 27 which is mounted on the cutter carriage. This rack is connected by a pivot 28 to a lever 29 which oscillates about a fixed pivot stud 30 and carries a roll 31, or equivalent pressure receiving abutment, which is engaged by one arm 32 of a bell crank lever 33 pivoted on a fixed stud 34 and having a second arm on which is a trundle roll 35 in engagement with an operating cam 36. Said cam is of hollow cylindrical form arranged to rotate about its geometrical axis and having an axially offset cam face 37 at one end. It is driven by the main shaft 38, which, in turn, is driven by a belt pulley 39. A loose pulley 40 is also mounted on the shaft to receive the belt when the machine is idle.

The cam 36 is driven with the desired rate of slow motion from the shaft 38 by means of differential gearing which consists of a planet pinion 41 carried by a crank pin 42 on the shaft and meshing both with an internal gear 43 on the opposite end of the cam cylinder from the face 37, and with a second hollow cylinder, or internal gear 44 in a second sleeve 45. Said sleeve and the cam are mounted on the same axis in a bearing 46, and the shaft 38 is preferably supported on the same axis by a bearing 47 of any suitable character within the cam cylinder. The internal gears 43 and 44 have different numbers of teeth, whereby when the gear 44 is held stationary, a slow movement is given to the cam by rotation of the shaft. Said gear 44 is held stationary while the machine is operating, by a ratchet 48 on a sleeve 49, which is secured to the sleeve 45 as shown in Figure 5, and such ratchet has a suitable number of abutments 48ª (in this case three, but permissibly more or less) with which engages a pawl 50 (Figures 5 and 6ª) under control of a tripping mechanism which causes the machine to be stopped when the work is completed, as will be later described.

It will now be evident that as the cam 36 is rotated, the rack 26 is moved back and forth endwise and that with every such movement said rack rotates the former 22 and the work spindle, at the same time causing or permitting the carriage to be moved bodily, owing to the reaction of the former against the abutment 23. Preferably the guideway for the cutter carriage is inclined to the horizontal so that gravity tends to move it in one direction and holds the face of the former in firm engagement with the abutment, thus taking up all backlash in the operating parts. Hence when the rack is moved to the left with respect to Figure 1, the pressure of the former against the abutment moves the carriage to the left and upward, while when the rack is moved to the right, the carriage is permitted to move in the same direction and downward by gravity under restraint of the former. If desired, a weight or spring may be applied to the carriage so as to assist the above-mentioned gravity actuation.

I prefer to arrange the grinding wheel so that its operative face is opposed to the face of the abutment whereby such faces have a relation similar to the opposite faces of a rack space. This relation is shown in Figure 8. It results in the important advantage that the work is held up to the grinding wheel by the positive engagement between two rigid members, namely, the former and the abutment, which prevents chattering and secures a more even and regular action of the tool on the work.

The abutment is adjustable as to both its position and the inclination of its active face. The necessity for these adjustments arises from the fact that the machine is designed to grind gears of different diameters, different pitches, and different angles of tooth face, and that to impart the necessary generating movement to the gear either larger or smaller formers must in some cases be substituted, which requires shifting of the abutment nearer to or farther away from the work spindle axis, or in other cases formers having different face curves must be substituted, which requires changing of the inclination of the abutment or of its position, or of both its inclination and position. Another function of the abutment adjustment is to give small increments of rotation to the work spindle for feeding the work to the grinding wheel. To accomplish these adjustments the abutment is rigidly fixed to a slide 51 (see Figures 1 and 4) confined in a vertical guideway in a holder 52 and provided with a tapped lug 53 through which passes an adjusting screw 54. The upper end of this screw is exposed at the upper end of the holder and its lower end has a step bearing in a foot piece 55 which rests on a horizontally adjustable wedge cam 56. A spring 57 presses on a shoulder on the screw 54 and holds the foot piece 55 in contact with the wedge cam. By rotating the screw 54 in one direction or the other, the abutment may be raised or lowered. A finer and accurate final adjustment for position is given to the abutment by the wedge cam 56, which is movable endwise in a horizontal guideway in a fixed part of the machine frame and has a threaded stem 58 surrounded by a spring 59 and engaged with an adjusting nut 60 and lock nuts 61. The spring 59 normally holds the adjusting nut 60 against the abutting surface of the fixed frame and pushes the wedge cam back when the nut is relaxed.

The holder 52 is pivoted on a stud 62 set into a fixed part of the frame, and is provided with two adjusting screws 63 and 64, the former of which enters a tapped hole in the frame and the latter abuts against a surface of the frame. By means of these screws the holder may be adjusted to any small angle upon the pivot 62 and there locked, thus changing the inclination of the abutment face as required.

Provision is made for adjusting both the position of the work with respect to the grinding wheel and the length of the movement given to the work. The first of these adjustments is accomplished by making the rod or rack bar 26 in two parts, connected by a sleeve 26ª in the nature of a turnbuckle, to which are applied lock-nuts 26ᵇ. The second adjustment is accomplished by making the pressure receiving roll 31 adjustable on the lever 29, such roll being carried by a hanger 65 which is pivoted to the lever 29 at 66 and is provided with webs 67 embracing the lever and having slots 68 through which, and a hole in the lever, passes a screw 69 having clamp nuts on its ends. The lever 29 is, in effect, a bell crank lever of which the part from 30 to 28 is one arm and that from 30 to 31 is the other arm, and the length of this latter arm may be changed by adjusting the roll 31 by the means just described. The same adjustment alters the distance of the contact point of roll 31 with lever arm 32 from the pivot 34 of the latter lever and so changes the ratio of the two levers.

It hardly needs to be said that a wide enough range of movement may be given by the means and adjustments here described to enable the grinding wheel to act on the entire face, from the point to the end of the characteristic curve at the root, of the tooth, of gear teeth of any size, pitch and face angle within the limits of size for which the specific machine is designed.

An important feature of the invention consists in mechanism for automatically indexing the work at the end of each rolling motion in one direction. Such mechanism combines accuracy with the utmost simplicity. It is shown in detail in Figures 2 and 3, and its mode of action is illustrated in Figures 9, 10 and 11. The spindle 19 is rotatably mounted in a sleeve 69 which is one of the two hollow trunnions of a casing or housing 70 which is rotatably mounted in the carriage 20. The other trunnion 71 of this housing is alined with the trunnion 69 and is rigidly connected to the gear 25 and former 22. The connection is here shown as made by a hub 73 on the gear which passes into the trunnion 71 and is suitably secured therein, by a key or otherwise, while the former is secured to the gear by a central stud 74 and a clamp screw 75. These mechanical details, however, are not of the essence of the invention, but may be modified in various ways. On the spindle 19 is mounted a hub 76, secured thereto by a key or other suitable means, and on said hub is secured, by a key 78 or otherwise, a ratchet wheel 79. Beside this ratchet a pawl carrier 80 is oscillatively mounted and carries a pawl 81 arranged to coöperate with the ratchet. The hub 76 is provided with an outstanding rib 82 to which there is detachably secured a ring or index head 83 having notches 84 in its periphery to receive a locking pin or equivalent stop. Such notches are equally spaced about the entire circumference of the index ring, and their number is equal to the number of teeth in the gear being ground. Specifically different index rings having different numbers of notches may be substituted for one another in setting up the machine for grinding gears with a greater or less number of teeth.

The casing 70 is constructed in part with a detachable cover or closing piece 85 to give access to its interior for making the substitutions indicated, and this cover piece is formed with an offset guideway 86 in which is mounted a locking pin 87 adapted to slide into and out of the notches 84, and a spring 88 which presses the locking pin toward the index disk. The length of such pin and of its engagement with the guideway are made great enough to eliminate substantially all lateral movement of the locking point of the pin, while such locking point and the notches 84 are complementally tapered to prevent looseness between the disk and pin. Preferably the upper part is internally bored to receive a considerable proportion of the holding spring 88. Beside the guideway 86 there is rotatably mounted in the cover 85 a rock-shaft 89 on which is mounted a pinion 90, an arm 91 external to the casing, and an arm 92 within the casing and having a stud 93 in the same zone, transverse to the axis of the casing, with a lug 94 on the pawl carrier 80. The pinion 90 is beside the locking pin 87 and meshes with teeth provided in the outer surface of such pin.

On the fixed frame of the machine is mounted a stop 95 in position to arrest the arm 91 when the casing nears the end of its rolling motion to the right with respect to Figures 1 and 2 and after the work piece has rolled clear of the grinding wheel. Continuation of the rolling motion after arm 91 has engaged stop 95 rotates the shaft 89 in its bearing and first retracts the locking pin from the notch which it has occupied in the index head, and then brings stud 93 into contact with lug 94 of the pawl carrier, as shown in Figure 9. Further motion causes the stud 93 to advance the pawl carrier far enough to bring the next notch of the index disk into line with the locking pin. The means for effecting this motion are so adjusted that this condition is reached at the moment the holder reverses its motion. With the beginning of the reverse motion the locking pin enters the notch now brought in line with it and thereafter the point of another tooth is brought into action with the grinding wheel. With upward or backward movement of the casing 70 and carriage 20, the face of this new tooth of the work piece is brought progressively to the grinding wheel from the point to the root, and then upon the next reversal and following the travel of the carriage and casing, a second pass of the same tooth face is made over the grinding wheel and ultimately the work is again indexed as just described. The stop 95 is adjustable.

It will now be appreciated that the connection for transmitting motion from the former and driving gear 25 to the work spindle 19 is made through the rotatable casing, the locking pin and the index disk, and that indexing of the work is effected by a change in the relation between the several parts of this motion transmitting means.

Included in the means just mentioned are several novel instrumentalities for establishing the relations between the several parts thereof, which, as they are important from the point of view of avoiding lost motion and securing accuracy, I claim as valuable features of the invention. The spindle 19 has its bearing rotatably in the trunnion 69, or in a bushing which lines said trunnion, and its inner end 96 is centered in the other trunnion. A nut 97 is screwed upon the spindle so as to secure a washer 98 against the end of hub 76 and thereby retain the pawl carrier 80 on the hub. A ring 99, which surrounds the spindle, is placed between this nut and a surface of the casing which is square with the axis and provides one of the end thrust bearings of the spindle. The ring 99 has a plane surface complemental to such thrust bearing surface and a spherical socket complemental to a spherical face on the nut 97 in order that it may bear squarely against the surface of the casing. Then the ring 99 is pressed against the complemental surface of the casing, and the casing itself is pressed against an end thrust bearing surface 100 of the carriage 20, by springs 101 confined between two slip rings 102 and 103, the former of which surrounds the hub 76 and bears against the web 82, while the latter surrounds the trunnion 69 outside of the casing and bears against a complemental thrust bearing surface 104 on the carriage. Thus all end shake between the work spindle and its holder (the casing 70), and between the holder or casing and the frame, is taken up by means which include the rings and springs last described and to that extent are common to both purposes. A large enough number of springs 101 are interposed between the slip rings to equalize the pressure on different sides of the axis, while such springs are prevented from moving relatively to one another in such manner as would jam the springs, by guide pins 105. The part 106 represents a stuffing box to prevent entrance of particles of abrasive and abraded metal into the bearings of the spindle and holder. It surrounds the spindle and is fastened to the carriage so as to cover the end of the adjacent trunnion bearing.

The grinding wheel 15 is preferably made with such a large diameter in proportion to the length of the gear teeth being ground that it is able to grind over the whole length of the faces of such teeth from tip to root without needing to be displaced axially of the gear. In other words the projection of the circumference of the wheel out of a chord equal to the length of the work piece is less than the clearance provided in the tooth space of the work piece beyond the penetration of the mating tooth. Thus the only movements required for the wheel, in addition to its rotation, are approach to and recession from the work and adjustment along its axis for accuracy of position.

To permit of these movements and adjustments, the grinder spindle is mounted in a holder 107 having two arms 108 and 109 which are separated from one another and have bearings to receive the ends of a pivot bar 110 on which they turn. This bar is secured rigidly to a fixed part 112 of the machine frame, by any suitable means. As here shown it is driven friction-tight into a sleeve 111 which is secured in the part 112 of the frame. The pivotal movement of the wheel holder permits the grinding wheel to be moved toward and away from the axis of the work spindle for grinding to the proper depth in gears of different diameters, and for enabling it to be trued from time to time. This movement is given to it by the following mechanism which is shown in Figures 3 and 8.

A cam 113 is secured to a shaft which turns in a fixed bearing 114 of the machine base, such cam being under the wheel holder and in contact with a boss 115 thereon. The cam carrying shaft extends outside of the base frame and carries a worm wheel 116 with which meshes a worm 117 on a hand-operated shaft 118 which is formed with a square end 119 to receive a wrench. The worm gear and worm are enclosed in a detachable casing 120 in which the shaft 118 has a bearing, and a second bearing 121 is also provided to hold this shaft steady. Thus by turning said shaft in one direction or the other, the grinding wheel may be withdrawn from or advanced toward the work piece.

For the purpose of axial adjustment of the grinding wheel, the holder 107 is adapted to slide endwise on the pivot bar. A gear 122 is rotatably mounted on one end of this pivot bar and has a threaded hub 123 which engages a nut 124 secured to the holder arm 108. The bearing in the other holder arm extends beyond the opposite end of the pivot bar and is pressed upon by a spring 125 bearing on a cap plate 126 which covers the end of the bearing so as to exclude grit. 127 is a guide rod for the spring 125 which is secured to the cap plate and mounted to slide through an opening in the base frame. Thus the spring takes up backlash between the threads of the screw 123 and nut 124, making the adjustments of the wheel in either direction proportional to the rotation of the screw. For rotating this screw I provide a pinion 128 meshing with the gear 122 and mounted on a shaft 129 which has a wrench-receiving end 130 projecting from the same side of the machine as the previously described adjusting shaft 118.

For truing the face of the grinding wheel, I have provided a truing tool 131 carried by an arm 132 and arranged to swing in the same plane with the active face of the wheel.

This arm is carried by a shaft 133 which projects to the exterior of the machine base and carries a gear segment 134 in mesh with a pinion 135 secured to a shaft 136 which is fitted to receive a wrench and is exposed at the same side of the machine with the shaft 118 and shaft 129. When the grinding wheel is withdrawn from the work, or even without thus withdrawing it, the truing tool holder may be moved back and forth across the active face, and at the same time the wheel may be adjusted endwise so that the unevenly worn parts of its face may be cut away. A diamond or any other suitable kind of truing tool may be here used.

Preferably the machine is organized to make a cycle of operations, such as grinding once around, or any desired number of times around the work, and then stop. The automatic stopping of the machine is accomplished by releasing the pawl 50 which normally holds the internal gear 44 of the driving differential stationary, release of such pawl permitting this gear to revolve and the cam 36 to become stationary, since resistance to rotation of the latter is much greater than the resistance of the gear 44 when not obstructed by the pawl. This release of the pawl is accomplished under the control of the work driving mechanism, the preferred means being as follows.

The pawl 50 is always under tendency to be disengaged from the ratchet 48, because the abutting faces of the pawl and ratchet teeth or shoulders are inclined at such an angle to the radius of the pawl as to exert a constant wedging or cam action upon the pawl away from the ratchet. This wedging tendency is resisted by an arm 137 (Figures 5 and 6) which is secured to a rock-shaft 138 on which pawl 50 is mounted, and has a toe 139 bearing on a cam 140. Said cam is rotatably mounted on a shaft 141 which is secured to the sleeve 49, which carries the ratchet 48, and is concentric therewith. A second ratchet 142 is secured to the cam 140, and a pawl holder 143 is oscillatively mounted on the extended sleeve-like hub 144 of the cam. This pawl carrier carries a pawl 145 cooperating with ratchet 142 and also has a pressure-receiving surface engaged with a wedge or cam element 147 on a rod 148 which is connected to the oscillating lever 33 and is reciprocated thereby. The rod 144 is guided between two studs, one of which is seen at 149, and it is supported against a fixed guide plate 150, between which and the pawl carrier it is arranged to travel. A spring (not shown) which may be of any well known or other suitable character, holds the pawl carrier against the wedge element and returns the carrier when the wedge element is withdrawn after having been advanced. Thus rotation is imparted step by step to the cam with every movement of the rod 148 in one direction.

The surface of cam 140 is provided with two dwells, one of which, 151, is so located that normally it holds the stop pawl 50 in locking relation with the ratchet of the driving differential, while the other dwell 152 is nearer to the axis of the cam and permits such movement of the arm 137 as will enable the holding pawl 50 to ride over the previously engaged tooth of the ratchet. Thus, when the shoulder 153 at the end of the dwell 151 passes the toe 139 the drive of the machine at once ceases. Between the dwells 151 and 152 is a gradual rise 154 which is adapted to be brought under the toe 139 by rotation of a hand wheel 155 secured to the cam so as to return the holding pawl 50 into locking relation with a tooth of the ratchet 48.

I have provided for varying the time which will elapse between starting the machine in operation and its automatic stoppage, by making the cam of two disks both alike in peripheral contour and arranged side by side on the supporting shaft with provision for angular adjustment of one relatively to the other. Such cam is shown in detail in Figure 7. By rotating one of the disks relatively to the other the angular distance between the rise 154, which moves the toe 139 in one direction, and the shoulder 153, which allows it to move in the other direction, may be altered and regulated. These complemental cam disks are connected together by a screw 156 which passes through a slot 157 in one of the disks and is threaded into one of a series of holes in the other disk, whereby it is possible to set the disks at any adjustment between the limits wherein respectively the rises and shoulders of both disks are side by side and that in which the high parts of both disks are located substantially end to end.

In addition to the automatic stopping of the machine, it is desirable to provide for stopping it manually at any time, and instantly. To permit of this being done the shaft 138 is mounted eccentrically in a bearing sleeve 158 which, in turn, is rotatable in a fixed bearing and is provided with an operating handle 159. By turning the handle outwardly, that is, to the left with respect to Figure 6, the fulcrum of the pawl 50 and arm 137 is moved away from the cam and ratchet combination enough to permit displacement of the holding pawl 50 from its operative position, even though the arm 137 is obstructed by the high part of cam 140. Return of the operating handle to normal position, of course starts the machine in operation again. Thus the machine may be stopped and started manually with more accurate control than is possible by shifting the driving belt from the tight to the loose pulley and back, since when the machine is thus stopped, the only obstacle to its instant stoppage is the inertia of the associated sleeves 45 and 49, which is inappreciable and is substantially less than that of the rapidly rotating main shaft and attached pulley.

Attached to the fast pulley 39, or to the main shaft 38, is a pulley 160 which drives the grinding wheel spindle 16 by means of a belt passing around it and also around a pulley 161 on said spindle.

It has been stated previously that by appropriately designing the former 22 and its abutment 23, such motion may be given to the work as will result in generating substantially any form which is capable of being generated by a combination of rotative and translative movements. The result can be attained, even though the surface of the abutment is other than a plane surface and though it be unlike the working face of the grinding wheel in profile. That is, using a grinding wheel with a plane working face, the desired curve may be generated in the work if the face of the abutment is otherwise than plane, provided the face of the former is correctly conjugate or complemental to it for the purpose specified. However, perhaps the largest field of use for the machine is that of grinding gears having the involute form of tooth curves, and certainly the simplest design of former and abutment, and one that is capable of being accurately produced and maintained in correct shape with the least difficulty and complication, is that in which the face of the former is an involute curve and the complemental face of the abutment is a plane surface. This condition is the one that is illustrated in the drawings.

When the involute former is used, the curve of the face is described with reference to the base circle or cylinder of the gear being operated on. This condition is illustrated in Figure 8 where the teeth of the gear being ground are shown at $a$. The curved line $b$ represents the projection in the plane of the paper of the base circle of the gear and $c$ represents the projection of the pitch circle. The face 24 of the former then is an involute curve of the same base circle $b$. This face is extended far beyond the points of the gear teeth, and its bearing on the abutment is farther from the axis of the work spindle than the outer circumference of the gear, but it has the same curve nevertheless and, following the law of involute curves, it has the same character of rolling action with respect to the abutment that the tooth of the work piece being ground has to the grinding wheel. Thus the gear is given a motion relative to the grinding wheel which is accurately and exactly that of a gear rolling in mesh with a rack, due allowance being made for the qualities of the material and mechanical difficulties of manufacture, inherent in machine construction, which practically limit the approach to absolute accuracy in the construction and operation of any machine. If any practicable deviation from the pure involute curve is required in the work, such deviation can be obtained by correspondingly modifying the curve of the former or the face of the abutment. The reason for causing engagement between the former and abutment to take place outside of the axis of the work piece as here indicated is that thereby a great length of bearing between the former and abutment is afforded. The former is, in effect, a gear tooth and the result of its relatively great length is that it remains in engagement with the abutment throughout the whole sweep of the work piece, not only while the tooth being ground is in contact with the grinding wheel, but also after it has left the wheel and the work is being indexed.

The necessary relation thus pointed out between the former and the work requires that a different former be substituted whenever a work piece having a different base circle is ground. Such substitutions are made easily by the means for attaching the former consisting of the stud 74 and screw 75 previously described, which require merely the removal of the screw to permit such a change. Figure 11 shows a small former 22$^a$ substituted in place of the larger formers shown in the other views. When such substitutions are made the abutment is adjusted by the means already described into the proper relation with the new former.

Various modifications in construction and arrangement of the machine and the various parts thereof may be made without departing from this invention or the protection which I claim. Some possible modifications have been already indicated in the introductory part of this specification and my claims are to be construed in accordance with this fact.

A particular modification designed specifically for the use of grinding helical gears is illustrated in Figure 12. Fundamentally the departure from the construction previously described consists in that the grinding wheel is mounted so that it may be adjusted angularly about that diameter of its face which is perpendicular to the axis of the work spindle, that is, in the form of machine here illustrated, the vertical diameter. Practically, it is required also, in order to carry out the desired effect, that the grinding wheel be driven by an independent self-contained motor, and that it, together with its motor and the associated means for adjusting and truing it, be carried by a subsidiary frame which is mounted on the main base of the machine with provision for angular adjustment about the axis indicated.

In Figure 12 a subsidiary frame is indicated at 165 and is supported by a part 166 of the base of the main frame, being engaged with or by a pivot 167 in the axis about which the adjustment must be made. On the wheel spindle is affixed the armature 168 of an electric motor 169, the latter being mounted upon the holder in which the grinding wheel has its bearings. This holder, the pivot shaft on which it oscillates, the cam and operating mechanism therefor by which the position of the wheel is adjusted, and the truing tool with the associated means for mounting and operating it, are all mounted in the subsidiary frame, but in their construction and arrangement with respect to one another they are all essentially like the corresponding parts already described, and are designated by the same reference characters. There is a difference in a detail of arrangement involved in placing the pivot shaft for the grinding wheel holder at the opposite side of the grinder spindle from that illustrated in the preceding figures, but this rearrangement does not alter the essential conditions previously described.

It will be evident that when the grinding wheel is adjusted, with the aid of the provisions here shown, so that the plane of its face makes the correct angle with the axis of the work and the operations of the machine are carried out exactly as hereinbefore explained, correct helical face curves will be generated and finished in the teeth of the work piece. The range of angular adjustment may be made as great as required for grinding helical teeth of any practicable helix angle.

What I claim and desire to secure by Letters Patent is:

1. A machine for generating and forming the teeth of gear wheels at analogous articles comprising a cutting tool having an active portion mounted to rotate in a plane perpendicular to its axis of rotation, a work-holding carriage guided to travel in a plane which is inclined to said active portion, a work spindle rotatably mounted in said carriage and adapted to support a work piece in operative relation to the cutting tool, a former connected rigidly with said work spindle, an abutment cooperating with the former and means for giving a reciprocating movement to said carriage and simultaneous oscillating movement to said spindle while maintaining the former in contact with the abutment, said former and abutment having contacting faces shaped to compel the rotary movement of the spindle to take place at such a rate, in combination with the translative movement of the spindle, that a predetermined curve is generated in the work by its resultant motion relatively to the cutting tool.

2. A generating machine for forming tooth curves of involute gears comprising a rotatably mounted cutter having an active portion in a plane perpendicular to its axis of rotation, a work-holding carriage, a work-holding spindle rotatably mounted in the carriage, a former connected to said spindle and having an involute face, an abutment having a face opposed to the face of said former and arranged in the same relation thereto as the face of a rack tooth to a conjugate gear tooth, and mechanism for moving said carriage in a straight path inclined to the plane of the said active face of the cutter and at the same time so rotating the work spindle and former that the face of the latter is maintained in contact with the opposed face of the abutment.

3. A gear generating machine comprising a work carriage mounted to reciprocate in a given path, a former rotatably mounted on said carriage, a gear to be ground operatively connected to said former to turn about the same axis with the latter, a rotatably mounted cutter having an operative face in a plane perpendicular to its axis of rotation and in position to engage a tooth of the gear wheel, an abutment for the former, and driving mechanism connected to the former so as to impose rotary motion thereon, the engagement of the former with said abutment causing a compound movement of rotation and translation to be given to the latter and to the gear in respect to the cutter.

4. A gear generating machine comprising a carriage movable back and forth in a given path, a work holder rotatably mounted in the carriage, a former secured to said work holder to rotate about the same axis therewith and having a face formed and arranged with respect to such axis similarly to the face of the gear tooth, an abutment for the former mounted in the same relation thereto as the face of a rack tooth complemental to said gear tooth, and a cutter having an active face in the same relation to the gear to be cut as a face of a rack tooth opposite to the face which corresponds to said abutment.

5. In a gear generating machine comprising a work carriage, means for mounting a gear rotatably thereon, a former operatively connected with said gear-mounting means to turn about the same axis with the latter, and an abutment against which said former bears; the combination with the foregoing of operating means comprising a gear wheel connected with the former, a rack in mesh with said gear wheel, and means for reciprocating said rack, whereby rotation is imparted to the former and translative movement to the carriage consequent upon the reaction of the former against the abutment.

6. A gear grinding machine comprising a reciprocatable carriage, a spindle rotatably mounted in the carriage adapted to hold the gear to be ground, a former so connected to the spindle that the angular movement of both will be equal, an abutment for contact with said former having a face conjugate to the contacting face of the former, and a grinding wheel arranged to act upon the teeth of the work-piece, said abutment and grinding wheel being arranged in planes having a relation to one another similar to the opposite faces of a rack space, and the tooth being ground being entered into such space.

7. A gear generating machine comprising in combination with a spindle adapted to hold a work-piece, of a movable carriage in which said spindle is oscillatable, a former connected to said spindle and having a face corresponding to one face of the gear tooth, an abutment arranged to be engaged by said face of the former, and a cutting tool having its operative portion arranged to engage the face of a tooth in the work piece, which tooth face is relatively opposite to the face of the former.

8. In a gear generating machine, means to give a compound movement of rotation and translation to the work comprising a carriage, an oscillative former on the carriage and to which the work piece is connected, a pinion coaxially secured to the former, a fixed abutment against which the former bears, and a driving gear element in mesh with said pinion.

9. In a gear grinding machine, a movable carriage, means for rotatably supporting the gear wheel to be ground on the carriage, a former connected with such gear wheel and oscillatable about the same axis therewith and having a face which is an involute curve, an abutment arranged to make engagement with said face of the former, and a grinding wheel having a plane active face arranged to coact with the tooth faces of the gear, the plane of said grinder wheel face and the plane of said abutment having the same relation to each other as the opposite faces of a tooth space in a rack which is conjugate to said gear and former.

10. In a gear generating machine, the combination of a work-holding spindle with a former associated therewith, and means for connecting said spindle and former comprising a stud axially alined with the spindle and engaged with the former, and means for preventing rotation of the former relatively to the spindle.

11. In a gear generating machine, the combination with a work-holding spindle, of a former having a face corresponding to the face of a gear tooth, a centering stud axially alined with the spindle and engaged with the former, the former being rotatable about the axis of said stud, and means for securing the former to the spindle in a manner which prevents its relative rotation, with its face in a relation to the spindle similar to the tooth face of a gear coaxial with the spindle.

12. In a gear generating machine, the combination with a work-holding spindle and a centering projection coaxial with said spindle, of a former having a face adapted to control, by reaction against an abutment, the rotational movement of the spindle, said former having a hole to receive the centering projection, and means for detachably securing the former in a given relation to the spindle.

13. In a gear generating machine, the combination with an oscillative holder by which the gear to be made may be held, of a former having an active face adapted to cooperate with an abutment for controlling the oscillative movement of said holder, a centering projection for the former arranged on said holder coaxial with the oscillative axis of the holder, the former having a hole to receive said projection and being removable therefrom, and means coacting between the former and holder to prevent rotation of one relatively to the other.

14. In a gear grinding machine, a means for controlling the rolling action of the gear to be ground comprising an oscillative member coaxial with such gear and to which the latter may be connected, a centering projection on said member coaxial with the oscillative axis thereof, and a former having a hole adapted to fit detachably over said projecteion, the said member and former having complemental means to prevent relative rotation of the former.

15. In a gear generating machine, the combination with a rolling holder for the gear to be made, a cutting tool operably mounted to cut the tooth faces of such gear, indexing means for such gear including mechanism mounted for movement with the holder, and an operating device for the same on another part of the machine, collectively arranged to index the gear at a predetermined point in the motion of the holder, a former and a cooperating abutment, one of which is detachably connected to the holder and the other is relatively stationary on the machine, arranged to control the rolling motion of the holder and gear relatively to the cutting tool, and means for securing said detachably connected member to the holder at a predetermined angle to the indexing mechanism.

16. In a gear generating machine, the combination with a rolling holder for the gear to be made, a cutting tool operably mounted to cut the tooth faces of such gear, indexing means for such gear including mechanism mounted for movement with the holder, a dog for operating said mechanism, a fixed stop on the machine arranged to actuate said dog when the holder is in a predetermined position, a former and a cooperating abutment, one of which is detachably connected to the holder and the other is relatively stationary on the machine, arranged to control the rolling motion of the holder and gear relatively to the cutting tool, and means for securing said detachably connected member to the holder at a predetermined angle to said dog.

17. In a gear generating machine, means for imparting rolling motion to, and indexing, the gear to be ground comprising an oscillatively mounted case, a work-holding spindle rotatably mounted in the case, a former secured to the case and adapted to control rotary and translative movements thereof, spindle rotating mechanism carried respectively by said work spindle and case and being normally inoperative, and a relatively stationary part arranged to engage and cause operation of said mechanism during the latter part of an oscillating movement of the case.

18. In a gear generating machine, a work oscillating and indexing mechanism comprising an oscillatively mounted case, a work spindle rotatably mounted in the case, a pawl and ratchet mechanism mounted on the spindle and adapted to give an intermittent rotation thereto when actuated, pawl-operating means carried by the case, means for oscillating said case, and a relatively stationary stop arranged to engage and operate said pawl-operating means in the course of an oscillating movement of the case.

19. In a gear generating machine, a carriage, a case oscillatively mounted in said carriage and having alined trunnions, a work holding spindle rotatably mounted in one of said trunnions, a former secured to another of said trunnions, an indexing head secured to the spindle, a complemental lock for said head secured to the case, whereby oscillating movement of the case imparts equal movement to the spindle, an abutment engaging the former to control rotary movement of the case and spindle during translative movement of the carriage, a pawl and ratchet indexing mechanism mounted on the spindle, and mechanism operable to release said lock and drive said pawl in sequence, but being normally inoperative and having an external actuating element, and a stationary stop member external to the case and arranged to engage said actuating element and cause operation of said mechanism in the course of the oscillating movement of the case.

20. In a gear generating machine, means for giving a rolling motion to the work and for indexing said work, comprising a spindle for the work, a former mounted coaxially with said spindle and with respect to which angular movement of the spindle is possible, a lock rigidly connecting said spindle and former together, means for applying linear displacement and angular movement to the former while said lock is engaged, and means for releasing said lock at the end of a working movement of the former and thereafter giving an indexing movement to the work spindle.

21. In a gear generating machine, a work holder having a translative and rotative movement whereby to give rolling motion to the work, a positive lock normally preventing rotation of the work relatively to said holder, and mechanism operated by the rolling motion of the work arranged to release said lock and index the work during the approach of the work to the end of its rolling travel.

22. In a gear generating machine, a work holder having a translative and rotative movement whereby to give rolling motion to the work, a positive lock normally preventing rotation of the work relatively to the said holder, and mechanism arranged to release said lock and index the work at the conclusion of the rolling motion, said mechanism being further arranged and operated to set the lock after indexing.

23. In a gear generating machine, the combination with an oscillating case and a work spindle rotatably mounted therein, of supporting means for the case and means for taking up end shake of the case and spindle, said last-named means comprising complemental end thrust bearings on the supporting means and case, complemental end thrust bearing surfaces between the spindle and the case, and opposed slip rings with interposed springs tending to spread them apart, one of said slip rings bearing on a surface of the support opposite to the first-named bearing surface, and the spindle having an opposed abutment against which the other of said rings bears.

24. In a gear generating machine, a carriage, a case oscillatively mounted in the carriage, end thrust bearing surfaces between the carriage and case at one side of the latter, a work carrying spindle rotatably mounted in the case, end thrust bearings between the spindle and the case, a second end thrust bearing surface on the carriage opposite to the first-named surface, a web carried by the spindle and having an end thrust surface opposite to and separated from the second-named surface of the carriage, separated slip rings engaging the last two surfaces, and springs interposed between said rings and forcing them apart and into engagement with the complemental bearing surfaces, whereby the pressure of said springs is enabled to take up end shake between the spindle and the case and between the case and the carriage.

25. In a gear generating machine, a work carriage, a case oscillatively mounted on the carriage for giving a rolling motion to the work, a work holding spindle rotatably mounted in the case to permit indexing of the work, and resilient take-up means arranged to take up end play between the spindle and case and between the case and carriage.

26. A gear generating machine including a work holder, a former connected to said work holder and adapted to cause a compound movement of rotation and translation to be given to the work holder, an abutment for said former arranged to cooperate therewith to obtain the effects set forth, and means for adjusting said abutment as to its position with respect to the former.

27. A gear generating machine including a work holder, a former connected to said work holder and adapted to cause a compound movement of rotation and translation to be given to the work holder, an abutment for said former arranged to cooperate therewith to obtain the effects set forth, and means for adjusting said abutment as to its inclination with respect to the former.

28. In a gear generating machine including a work holder and a motion governing former associated therewith, an abutment complemental to said former, and means for mounting and adjusting said abutment, said means comprising a slide linearly movable and to which the abutment is secured, and a machine element engaged with the slide and holder constructed and arranged to shift the slide.

29. In a gear generating machine including a work holder and a motion governing former associated therewith, an abutment complemental to said former, and means for mounting and adjusting said abutment, said means comprising a pivotally mounted holder to which the abutment is secured, and adjusting devices operable to place said holder in different positions about its pivot.

30. In a gear generating machine, an oscillatively and translatively mounted work holder, a former connected with said holder and oscillative therewith, an abutment cooperating with the former to control the compound movement given to the work, an adjusting screw engaged with said abutment for shifting it, a stop on which said screw reacts in shifting the abutment, and a wedge cam engaged with said stop for shifting the latter and therewith the screw and abutment.

31. A gear grinding machine comprising, in combination, a holder for the gear to be ground, a grinding wheel, a holder for the grinding wheel and means for adjusting said grinding wheel axially comprising a nut and screw, one of which is connected to said holder and the other is relatively stationary, a spring acting on the holder to take up looseness between said nut and screw in the axial direction thereof, and means for rotating that member of the nut and screw couple which is rotatable.

32. In a gear grinding machine, means for holding the gear to be ground, a grinding wheel, a spindle for said grinding wheel, a holder in which said spindle is mounted, a stationary pivot on which said holder is mounted on a different axis from that of the wheel spindle with provision for both endwise and angular movement, a screw rotatably supported on said pivot, a nut engaging said screw and secured to the wheel spindle holder, and a spring pressing on said holder with a component of pressure in the axial line of the pivot.

33. In a gear grinding machine, a holder for the gear to be ground, a grinding wheel, a pivotally mounted holder for said grinding wheel on which the latter is rotatably mounted, with its axis approximately in the middle plane of the gear, the pivot of said holder being at one side of the axis of the wheel to permit movement of the wheel toward and away from the gear, a cam supporting the holder and maintaining the grinding wheel in place with respect to the work, and means for rotating said cam, whereby to shift the grinding wheel toward and away from the axis of the gear.

34. In a gear grinding machine, the combination with a back and forth moving carriage, of driving mechanism for so moving said carriage comprising a cam, a driver, a differential mechanism between said driver and cam constructed to propel the latter at a different speed, and motion-transmitting connections between the cam and the carriage.

35. In a gear grinding machine, the combination with a back and forth moving work carriage, of driving mechanism for so moving said carriage comprising an associated rotatable cam and sun gear, a second and independently rotatable sun gear having a different number of teeth from the first-named sun gear, a planetary pinion in mesh with both said sun gears, driving and carrying means for said planetary pinion, means for holding the second sun gear stationary and releasing it, whereby, respectively, to cause action or inaction of the cam, and motion-transmitting connections between the cam and said carriage.

36. In a gear generating machine, the combination with a back and forth movable work-holding carriage, of means for so moving said carriage comprising a cam having an associated sun gear, transmission means for imparting movement to the carriage and controlling such movement from and by said cam, a second and independently rotatable sun gear having a different number of teeth than the first-named sun gear, a planetary pinion in mesh with both sun gears, means for holding and propelling the said pinion about the axis of the sun gears, a stop shoulder connected with the second sun gear, a pawl cooperating with said shoulder to hold the second sun gear stationary, and controlling means for said pawl operable in connection with the movement of said carriage to permit release of the pawl after a predetermined number of movements of the carriage.

37. In a gear generating machine, the combination with a work-holding carriage and means for reciprocating it, of a driving mechanism for said reciprocating means consisting of a cam acting on said reciprocating means and having an internal gear, a second independently rotatable internal gear having a different number of teeth, a driving shaft, and a planetary pinion carried eccentrically by said drive shaft and running in mesh with both said internal gears, the second internal gear being adapted to be held fast or released, whereby respectively to cause action and inaction of the cam.

38. In a gear generating machine, the combination with a work-holding carriage and means for reciprocating it, of a driving mechanism for said reciprocating means consisting of a cam acting on said reciprocating means and having an internal gear, a second independently rotatable internal gear having a different number of teeth, a driving shaft, and a planetary pinion carried eccentrically by said drive shaft and running in mesh with both said internal gears, the second internal gear being adapted to be held fast or released, whereby respectively to cause action and inaction of the cam, a stop shoulder connected with the second internal gear, a pawl cooperating therewith to hold said gear stationary, and controlling means for said pawl operated by the reciprocating mechanism to permit release of the pawl after a predetermined number of reciprocations of the carriage.

39. In a gear generating machine of the character described, a work carriage, a mechanism including a differential gearing driving said carriage, said gearing including a sun gear having a stop shoulder, a pawl cooperating with said shoulder for arresting said gear and being constantly under tendency to be disengaged from the shoulder, an arresting device normally preventing the pawl from being so disengaged, an intermittent mechanism operated by the machine for disabling said arresting device and thereby permitting disengagement of the pawl after a predetermined number of actions of the carriage driving mechanism.

40. In a gear generating machine of the character described, a carriage, mechanism including a differential gearing for driving said carriage, said gearing including a sun gear having a stop shoulder, a pawl cooperating with said shoulder, and the shoulder being so formed that it constantly tends to displace the pawl to inoperative position by cam action, an arresting device preventing said pawl from being displaced when the machine is in operation, and intermittent mechanism operated by the machine for disabling said arresting device after a predetermined number of actions of the carriage driving mechanism.

41. In a machine of the character described, a differential mechanism including a sun gear having an arresting shoulder, a pawl complemental to said shoulder, the shoulder being shaped to exert pressure on the pawl tending to displace it into inoperative position, a dog connected with the pawl, an obstructing cam complemental to said dog and having a portion which, when engaged with the dog, prevents such displacement of the pawl, and having another portion which, when opposite the dog, permits such movement thereof as occurs with displacement of the pawl, and intermittent mechanism driven by the operating parts of the machine for so propelling said obstructing cam past the dog.

42. In a machine of the character described, a differential driving mechanism including a sun gear having an arresting shoulder associated with it, a pawl arranged to engage said shoulder to prevent movement thereof, but being so arranged and the shoulder so formed that pressure exerted by the shoulder on the pawl tends to move the latter out of holding position, a dog connected with the pawl and both said dog and pawl being mounted to rock on the same pivot axis, a cam having high and low portions, one of which portions, by engaging the dog, holds the pawl in arresting engagement with said shoulder, and the other of which portions when passing the dog permits the latter and the pawl to swing in the manner which permits displacement of the pawl to inoperative position, and an eccentric bearing for the pivot axis of the pawl and dog, said bearing being rotatable whereby to permit disengagement of the pawl independently of the dog.

43. A gear grinding machine comprising the combination with a work carriage, a work spindle rotatable in the carriage, means for reciprocating the carriage, a former connected with the spindle and a cooperative abutment for giving rotary movements to the work while the carriage is shifted, and a grinding wheel arranged to engage the face of a tooth of the work piece and being mounted with provision for angular adjustment to place the plane of its working face at an inclination to the axis of the work spindle, whereby to generate and finish helical gears.

44. A gear generating and finishing machine comprising a work spindle adapted to hold a gear to be ground, a grinding wheel having an active face perpendicular to its axis arranged in position to act on the face of a tooth of the work piece, means for effecting linear translative movement between the work piece and grinding wheel, a former and a complemental abutment, one of which is connected with the work piece to oscillate simultaneously therewith and the other of which is relatively stationary, both being arranged to cause rotary movement of the work piece while such translative movement takes place, and the grinding wheel being arranged with capacity for angular adjustment so as to place the plane of its working face at a desired angle to the axis of the work for grinding helical gears.

45. A gear generating machine comprising the combination of a work carriage, a work spindle rotatable in the carriage, means for reciprocating the carriage, a former and a complemental abutment having the relation to one another of conjugate gear elements, one of which elements is connected to the spindle and the other is relatively stationary, for giving a rolling movement to the spindle and the work piece carried thereby as the carriage is reciprocated, and a cutting tool arranged with its operative elements arranged to travel in a plane corresponding to that of the face of a rack tooth in mesh with a tooth of the work piece, said cutting tool being adjustable about an axis in its plane and transverse to the work spindle axis, whereby to generate helical teeth in the work.

46. A gear generating machine comprising the combination of a work carriage, a work spindle rotatable in the carriage, means for reciprocating the carriage, a former and a complemental abutment having the relation to one another of conjugate gear elements, one of which elements is connected to the spindle and the other is relatively stationary, for giving a rolling movement to the spindle and the work piece carried thereby as the carriage is reciprocated, a cutting tool arranged with its operative elements arranged to travel in a plane corresponding to that of the face of a rack tooth in mesh with a tooth of the work piece, said cutting tool being adjustable about an axis in its plane and transverse to the work spindle axis, whereby to generate helical teeth in the work, and a prime mover coupled with said tool for driving it and being angularly adjustable with the tool.

47. In a gear generating machine an oscillatively and translatively mounted work holder, a former connected with said holder and oscillative therewith, an abutment cooperating with the former to give a resultant movement to the work which is compounded of such oscillative and translative movements, an adjusting screw engaged with said abutment for shifting it, and a wedge on which said screw acts, which wedge is movable for giving a fine adjustment to the screw and abutment in unison.

48. In a gear generating machine, a work holder which is movable both oscillatively and translatively, a former connected to said holder, an abutment having a face on which said former is adapted to roll in the manner of a traveling gear element, and means for shifting said abutment in a direction transverse to its face, said means comprising a coarse feed machine element and a finely adjustable machine element arranged to act through said coarse feed element.

49. In a gear generating machine as set forth in claim 48, the arrangement of said stationary stop member with provision for adjusting the same.

In testimony whereof I have affixed my signature.

EDWIN R. FELLOWS.